United States Patent [19]

Bauer et al.

[11] 4,335,433

[45] Jun. 15, 1982

[54] METHOD FOR CORRECTING NAVIGATION ERRORS DUE TO WATER CURRENTS

[75] Inventors: Russell H. Bauer, Glendale, Md.; Madeleine Heidkamp, Buena Park, Calif.

[73] Assignee: The United States of America as represented by the Secretary of the Navy, Washington, D.C.

[21] Appl. No.: 160,049

[22] Filed: Jun. 16, 1980

[51] Int. Cl.³ ........................ G06F 15/20; G06F 15/50
[52] U.S. Cl. ....................................... 364/443; 364/450; 73/178 R
[58] Field of Search .............. 364/443, 447, 449, 450, 364/451, 452, 453, 454, 457, 459; 73/178; 343/112 R

[56] References Cited

U.S. PATENT DOCUMENTS

| | | | |
|---|---|---|---|
| 3,111,670 | 11/1963 | Gaudillere | 343/112 R |
| 3,453,624 | 7/1969 | Rockey | 364/450 |
| 3,588,478 | 6/1971 | Anthony | 364/450 |
| 3,630,079 | 12/1971 | Hughes et al. | 73/178 |
| 3,906,204 | 9/1975 | Rigdon et al. | 364/453 |
| 3,941,984 | 3/1976 | Chappell et al. | 364/452 |
| 4,144,571 | 3/1979 | Webber | 364/450 |
| 4,253,149 | 2/1981 | Cunningham et al. | 364/452 |

OTHER PUBLICATIONS

"Satellite Navigation"—published in American Practical Navigator in 1977 by the Defense Mapping Agency, Hydrographic Center pp. 1019–1065.
"Satellite Fix Computation Subroutine SFIX"—published in Technical Report T6-1273, entitled AN/5-RN-19(XN-1) Radio Navigation Set, vol. 2, in Sep. 1975, pp. 93-142.

Primary Examiner—Felix D. Gruber
Assistant Examiner—Gary Chin
Attorney, Agent, or Firm—R. S. Sciascia; A. L. Branning

[57] ABSTRACT

In a satellite navigation system for an ocean vessel, a major source of error is unknown ocean currents when the navigation is done by dead-reckoning with respect to the waters. The present method for determining and correcting for ocean navigation error which is caused by unknown ocean currents provides a highly accurate position of the vessel with respect to the earth. The position error reflects not only the difference between a dead-reckoned position and a satellite fix position which up-dates the dead-reckoned position but also accounts for the motion of the vessel due to the ocean currents during the time between the satellite lock-on and the actual error computation and correction.

5 Claims, 9 Drawing Figures

METHOD FOR CORRECTING NAVIGATION ERRORS DUE TO WATER CURRENTS

DESCRIPTION OF THE PRIOR ART AND CURRENT TECHNOLOGY

Prior art satellite navigation systems generally fit into several categories. The first category includes systems which directly "measure" velocity and position with respect to the ground and compare this inertial position with an updated fix position to determine errors in the inertial system. U.S. Pat. No. 3,702,477 is an example. This patent discusses apparatus which compares doppler frequency shift measured from satellite signals with doppler frequency shift measured by inertial sensors. The difference between the two measured shifts is used to generate a set of error signals that represent estimates of position and velocity errors in the inertial sensors. Software is provided which combines the satellite data and inertial data of the system to achieve a continuous position and velocity output with decreased "drift" error; the error referred to being related to inertial instrument "drift". The reference is primarily directed to comparing two physically "measured" quantities and correcting for errors by means of a Kalman filter which "may generate a set of inertial instrument bias corrections". According to U.S. Pat. No. 3,702,477, "measurements" or observables are fed into the Kalman filter to produce correct position and velocity outputs of an aircraft relative to the ground. U.S. Pat. Nos. 3,558,478, 3,630,079, and 3,941,984 are also of this category, relating to systems which "measure" position and velocity with respect to the ground. U.S. Pat. No. 3,588,478 teaches an inertial navigation system wherein a dead reckoning computer is updated by RF signals from a satellite to correct for drift due to "sensing devices and the computer". To correct for wind currents, two mechanical inputs are fed into a computer which generates a wind adjustment factor based on the sensed inputs. U.S. Pat. No. 3,630,079 employs a plurality of sensors (such as water speed sensor, a gyrocompass, or an acoustic doppler device) the outputs of which are compared or combined to determine absolute position of a vessel between periodic signals from an orbiting satellite. Finally, U.S. Pat. No. 3,941,984 teaches an integrated system which dead-reckons between satellite fixes and specifically addresses the problem of "drift" due to ocean currents. This reference corrects for dead-reckoning errors by combining a LORAN system together with a satellite navigation system to enhance the accuracy of position data generated by a shipborne doppler sonar or other "measuring" apparatus. Orthogonal velocity errors are estimated by a computer program which combines LORAN data from a plurality of stations over a predetermined period by means of a least-mean-square fit subroutine. The above-discussed references attempt to *physically* "measure" position error between fixes by compensating for various types of drift effects in the measuring devices.

The references in the above category have two common features which limit their effectiveness. First, because they are significantly measurement dependent in detecting between-fix position errors, the systems of the references are affected by weather, geography, and environment which affect cost and reliability. For example, ocean floor topography affects sonar (or acoustic) doppler. Weather and location of stations limits the boundaries wherein vessel position may be determined by LORAN. And cost, reliability, and maintenance are important concerns with respect to sensors. Second, the above-cited references determine absolute position and velocity (i.e., relative to ground) through direct measurement and not by first measuring position and velocity relative to the ocean, "computing" an "ocean drift" correction therefrom, and then combining the "ocean drift" correction with dead-reckoning and satellite fix data to yield absolute position. The references attempt to resolve position error by adjustment measuring apparatus rather than determining the error due to environment changes. The references do not address the question of solving for ocean current so that it can be combined with ship velocity relative to the ocean in order to account for the doppler effect due to ship motion. Where relative velocity can nearly always be measured but absolute velocity measurement is dependent on numerous factors, the disadvantages of measuring absolute velocity and position (as performed in the prior technology) are evident.

A second category of patents includes U.S. Pat. No. 3,453,624. In references of this type, the path of a craft is determined by dead-reckoning based on the previously computed craft position, craft speed and the computed velocity of the medium through which the craft passes. In U.S. Pat. No. 3,453,624, a wind velocity term labelled "new wind estimate" is described as a function of "old wind estimate", "long term dead-reckoning position", and a "smoothing time constant". While directed specifically to a current correction factor, the reference fails to account for various effects the wind (or medium) velocity term has on the navigation system. The wind or current estimate is used just to determine the actual ground speed of an aircraft; but the current estimate assumes the correctness of the previous update position in the determination. While the cited reference recognizes the relativistic effect of wind speed on aircraft speed, it does not recognize that the position "fixed" by VORTEC means (i.e., X1 or X2 in the equations) may be in error due to the effect craft motion has on the received doppler. Although the reference of the second category accounts for the effect of wind velocity on ground speed (see FIG. 2), it does not consider how the motion of the craft (due to wind velocity) affects the doppler shift sensed by the satellite.

SUMMARY OF THE INVENTION

The present method is an improvement over the above-discussed prior art navigation techniques and systems by deriving error-compensated, absolute position data with respect to the earth from relative position measurements with respect to the water. The mechanical, geographical, and environmental limitations of prior techniques are greatly diminished.

The present method is a further improvement in that its error compensation accounts for the effects of vessel motion on satellite position fixing. Whereas, the prior art assumes that the satellite fix is correct in updated dead-reckoned position data, the present invention accounts for the inaccuracy in satellite position fixes due to water current effects. The error resulting due to the time which elapses between the instant of satellite lock-on and the time when that fix position is calculated is also accounted for.

In determining the initial satellite fix error due to water current, a least-squares fit process is employed. Given noisy or asymmetrical sensed input data, an attempt to determine the error could result in a non-convergent output over successive fixes. The present method provides an alarm in such an instance.

The present invention provides an accurate ocean navigation method which accounts for doppler effects of ocean vessel motion introduced by constant or slow-changing ocean currents.

DESCRIPTION OF THE DRAWINGS

FIGS. 3(a-d) is a detailed flow chart showing the method of the present invention in correcting for navigation position errors due to ocean currents.

DESCRIPTION OF THE PREFERRED EMBODIMENT

Operation of the Invention

Figure 1:
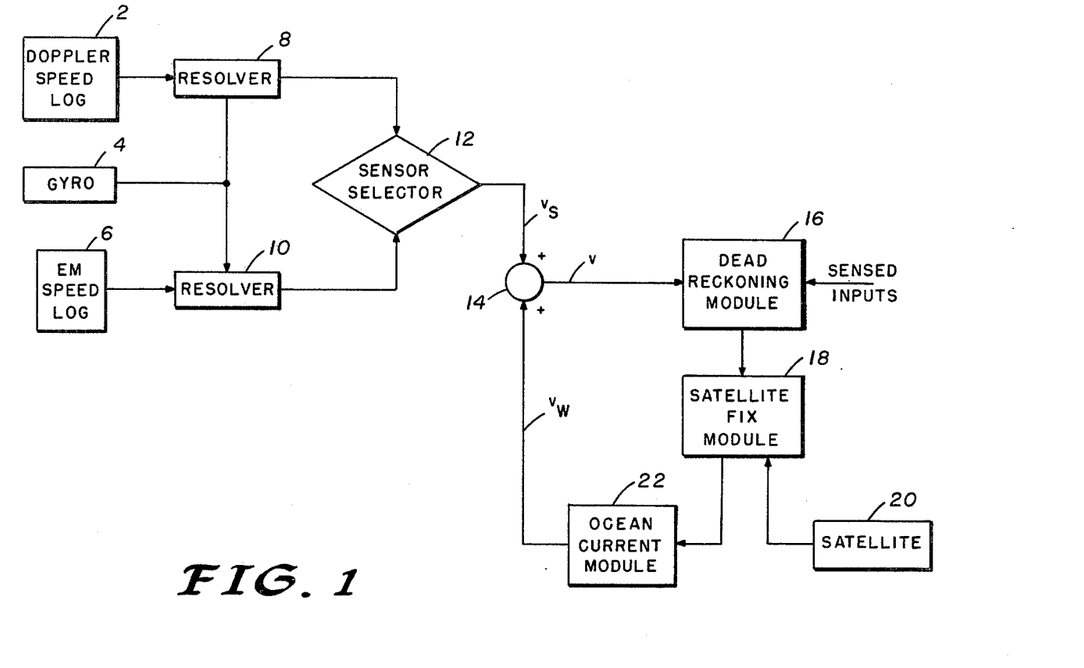
FIG. 1 is a block diagram of the navigation system which employs the present invention.

Referring to FIG. 1, the environment of the invention is shown. A doppler speed log 2 (which may be an MRQ-4016A two axis doppler sonar) and a gyrocompass 4 (which may be a Sperry Mark 29 gyro) comprise a primary means for detecting the velocity of a ship or ocean vessel (not shown), with respect to the water. The position of the ship is to be determined. As indicated in FIG. 1, an EM log 6 may be used as an alternative or back-up system for acquiring ship velocity information. The speed from either the doppler speed log 2 or the EM log 6 can be combined with heading data from gyro 4 in conventional fashion in resolvers 8 or 10, respectively, to provide ship velocity $v_s$ with respect to the water. The desired $v_s$ is switched on by a sensor selector 12. As is well known, ship velocity $v_s$ is combined in element 14 with a signal corresponding to water velocity $v_w$ to provide a total velocity $v$ with respect to the earth which enters a dead-reckoning module 16. Entering the dead-reckoning module 16 are the following inputs: latitude, longitude, time, and total velocity $v$.

Figure 2:
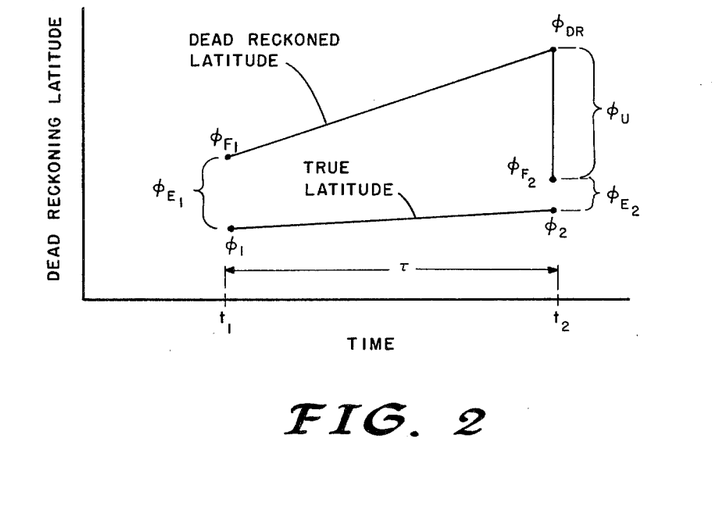
FIG. 2 is an illustration which graphically portrays the errors sought to be corrected by the present invention.

Referring for the moment to FIG. 2, the problem addressed by the present invention is readily discernible. In FIG. 2, latitudes are shown for two satellite fixes at times $t_1$ and $t_2$. $\phi_1$ and $\phi_2$ correspond to true but unknown ship latitude at times $t_1$ and $t_2$, respectively. There are also known satellite fix latitudes $\phi_{F1}$ and $\phi_{F2}$ taken at lock-on times $t_1$ and $t_2$, respectively. In addition, based on dead-reckoning between satellite fixes at times $t_1$ and $t_2$, a known dead-reckoned latitude $\phi_{DR}$ at time $t_2$ is generated. The significant point to note is that the satellite fix latitudes $\phi_{F1}$ and $\phi_{F2}$ differ from the true latitudes $\phi_1$ and $\phi_2$. The discrepancy is represented by satellite fix errors $\phi_{E1}$ and $\phi_{E2}$ which are due in part to a doppler shift caused by an unknown water velocity $v_w$. By considering doppler effects, an accurate estimate of $v_w$ is determined.

Still referring to FIG. 2, the graphical representation suggests the following relationships. A latitude update $\phi_u$ is defined as:

$$\phi_u = \phi_{F2} - \phi_{DR} \tag{1}$$

with $$\phi_{DR} = \phi_2 + \phi_{E1} + v_N \tau \tag{2}$$

where:

$v_N$ represents a constant velocity error in the north direction which results in a satellite fix error relative to true position; and $\tau$ corresponds to the time between fixes.

In words, relationship (2) states that the dead-reckoned latitude at time $t_2$ is the true latitude $\phi_2$ plus the absolute satellite fix error at the previous fix at a time $t_1$ plus an unknown error due to a velocity north error $v_N$ occurring between fixes. That is, the total latitude error at time $t_2$ is the sum of the true latitude error at the previous fix ($\phi_{E1}$) and the accumulated position error due to unknown $v_N$ between the previous fix and the current fix ($v_N\tau$).

Noting from the graph of FIG. 2 that:

$$\phi_{F2} = \phi_2 + \phi_{E2} \tag{3}$$

$\phi_{E2}$ is the satellite fix error at the current fix and, like $\phi_{E1}$, is partially predictable where the velocity leading to the fix error is assumed constant. Combining equations (1), (2) and (3), the latitude up date becomes:

$$\phi_u = \phi_{E2} - \phi_{E1} - v_N\tau \tag{4}$$

Similarly, a longitude update may be set forth as:

$$\lambda_u = \lambda_{E2} - \lambda_{E1} - v_E\tau \tag{5}$$

where $v_E$ is an unknown velocity east error.

The following terms describe the satellite fix error factors in conventional differential notation. Changes in latitude and longitude fix positions ($\phi_{F2}$ and $\lambda_{F2}$) are related to changes in velocity north ($v_N$) and velocity east ($v_E$) errors.

$A_{11} = \partial \phi_{F2}/\partial v_N$ $A_{12} = \partial \phi_{F2}/\partial v_E$ $A_{21} = \partial \lambda_{F2}/\partial v_N$ $A_{22} = \partial \lambda_{F2}/\partial v_E$ Using primes (') to indicate $A_{ij}$ values for the previous satellite fix, the satellite fix errors (excluding small random errors due to the receiver and satellite system) may be represented by:

$\phi_{E2} = A_{11}v_N + A_{12}v_E$ $\phi_{E1} = A'_{11}v_N + A'_{12}v_E$ $\lambda_{E2} = A_{21}v_N + A_{22}v_E$ $\lambda_{E1} = A'_{21}v_N + A'_{22}v_E$ Using the above term notation in relationships (4) and (5), the following matrix equation results:

$$\begin{pmatrix} v_N \\ v_E \end{pmatrix} = \frac{\begin{pmatrix} A_{22} - A'_{22} - \tau & A'_{12} - A_{12} \\ A'_{21} - A_{21} & A_{11} - A'_{11} - \tau \end{pmatrix} \begin{pmatrix} \phi_u \\ \lambda_u \end{pmatrix}}{\Delta} \quad (6)$$

where:

$$\Delta = (A_{22} - A'_{22} - \tau)(A_{11} - A'_{11} - \tau) - (A'_{12} - A_{12})(A'_{21} - A_{21}).$$

Small random errors which relate to the receiver and satellite fixing system affect the accuracy of the above matrix. However the effect of these random errors are negligible and ignored.

Ignoring the differential $A_{ij}$ terms, a simplification of matrix (6) can be set forth as follows:

$$v_N(\text{approximate}) = \phi_u / \tau \quad (7)$$

$$v_E(\text{approximate}) = \lambda_u / \tau \quad (8)$$

Equations (7) and (8) are approximations of equation (6). They do not solve for the velocity errors as precisely as does equation (6).

The relationships set forth in matrix equation (6) and in equations (7) and (8) provide solutions for the unknown velocities which cause error in the latitude and longitude positions of the vessel. When the unknown velocities have been solved for they are used in the dead-reckoning module 16 (of FIG. 1) to improve performance as reflected in FIG. 2.

Referring back to FIG. 1, the position outputs of the dead-reckoning module 16 are $\phi_{DR}$ and $\lambda_{DR}$, which enter a satellite fix module 18. The satellite fix module 18 is, in turn, in communication with a satellite 20, which provides data to the satellite fix module 18 indicating when there is a fix. The satellite fix module 18 uses the outputs $\phi_{DR}$ and $\lambda_{DR}$ from the dead-reckoning module 16 and provides $\phi_{F1}$, $\phi_{F2}$, $\lambda_{F1}$ and $\lambda_{F2}$ derived from the satellite 20 to an ocean current module 22.

The ocean current module 22 is the principal element of the invention. It receives the latitude inputs $\phi_{DR}$, $\phi_{F1}$, and $\phi_{F2}$ and the longitude inputs $\lambda_{DR}$, $\lambda_{F1}$, and $\lambda_{F2}$; generates an indication of velocity north error $v_N$ and velocity east error $v_E$; and provides a water velocity vector $v_w$ which includes the latitude and longitude velocity errors due to vessel motion relative to the satellite 20.

The ocean current module 22 has a plurality of signal inputs corresponding to sensed inputs. In one embodiment, the sensed inputs are encoded to form a digital word. The digital word addresses a location in a Random-Access Memory (RAM) which provides the appropriate $v_N$ and $v_E$ outputs. The $v_N$ and $v_E$ outputs are then vectorially combined to give a water velocity $v_w$ output as shown in FIG. 1.

A computer program based on the flow chart of FIG. 3 (a through d) implements the above embodiment, effecting the necessary responses in the ROM and RAM hardware to provide the sought inputs. Therein, the sensed inputs are digitally encoded and combined as set forth in relationships (1) through (6) or (1) through (5) and (7) and (8) as selected.

Determination of Ocean Current Solution

In FIG. 3, the $A'_{ij}$ parameters (i.e., the $A_{ij}$ parameters for the previous satellite fix) are entered into storage memory elements $W_{ij}$. The $A'_{ij}$ parameters, previously defined as partial derivatives, represent the differential values corresponding to the last satellite fix. Previous latitude and previous longitude position update determinations, $\phi_u$ (the correction between the dead-reckoned latitude $\phi_{DR}$ and the satellite fix latitude $\phi_{F2}$ in FIG. 2) and $\lambda_u$ (the corresponding correction between the dead-reckoned longitude $\lambda_{DR}$ and the satellite fix longitude $\lambda_{F2}$) are also entered into storage (SB) along with relative motion table PLAT and PLON. Each relative motion table PLAT or PLON comprises a plurality of position values taken at equal intervals during a satellite pass. The distance to the center of the earth (RNAV) is calculated in straightforward fashion based on position, RNAV being used to convert orthogonal velocity determinations into binary angular measurements (BAMs).

Figure 4:
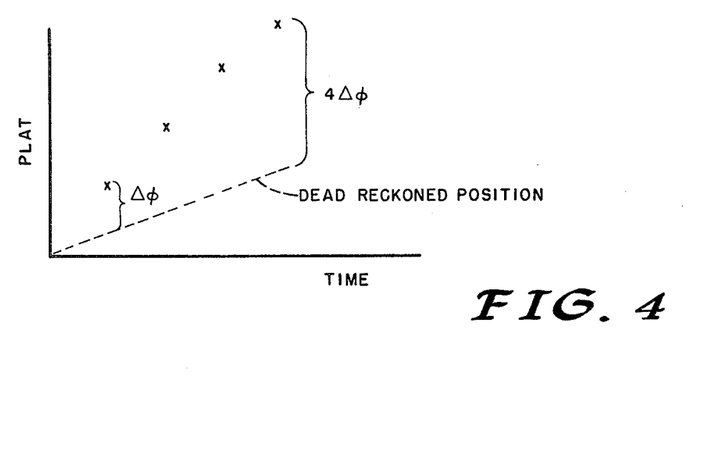
FIG. 4 is an illustration showing the effects of introducing an error into the system to determine sensitivity.

In accordance with the present invention, a hypothetical velocity north error $v_N$ (e.g., one knot in the present discussion) is introduced into the system. The cumulative effect of such error on the values in the PLAT table over time is depicted in FIG. 4. For each successive point, an additional $\Delta\phi$ error would be added to the dead-reckoned position determination. To compensate for the introduced error a loop adds the corresponding $\Delta\phi$ error into each value in the PLAT table. (TEMP indicates a cumulative value which increments by $\Delta\phi$ until the looping ends). A SOLVE routine is then implemented in straightforward fashion to give new $\phi_u$ and $\lambda_u$ values. Partial derivatives $A_{11}$ and $A_{21}$ are then calculated, accounting for the velocity north error $v_N$. Specifically, original $\phi_u$ and $\lambda_u$ values SB(0,1) and SB(2,3) are respectively subtracted from the newly calculated values $\phi_u$ and $\lambda_u$ (which include the one knot error), yielding a measure of sensitivity in latitude and longitude to a velocity north error $v_N$.

Figure 3A:
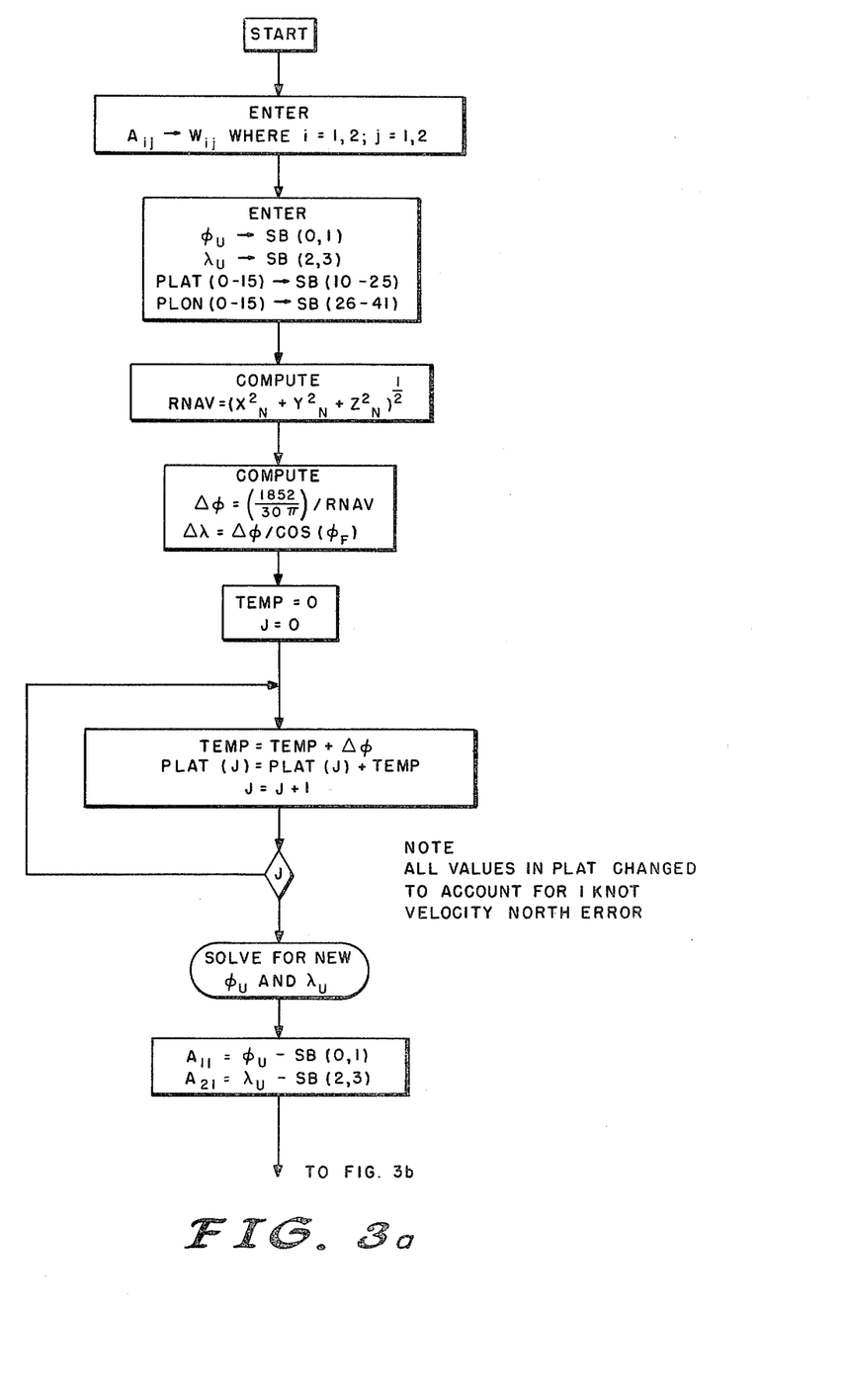
Figure 3B:
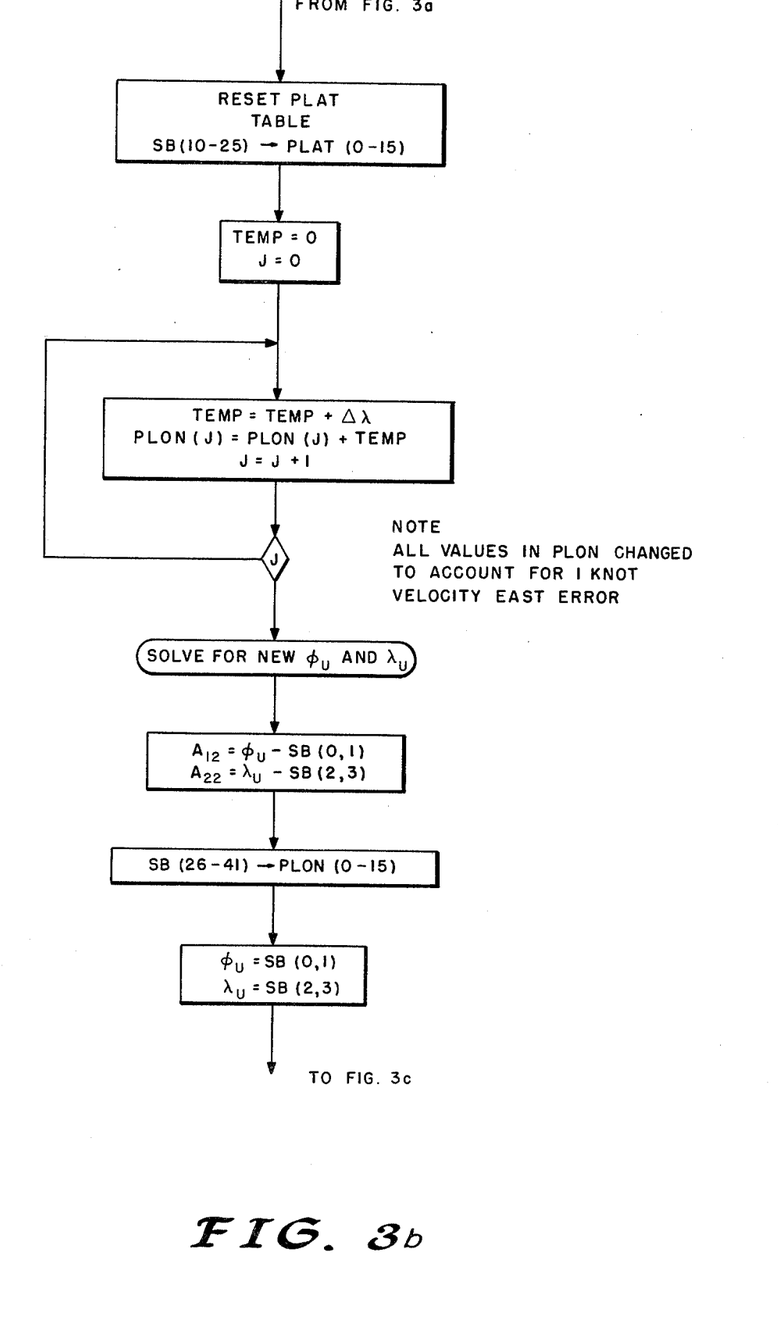
Figure 3C:
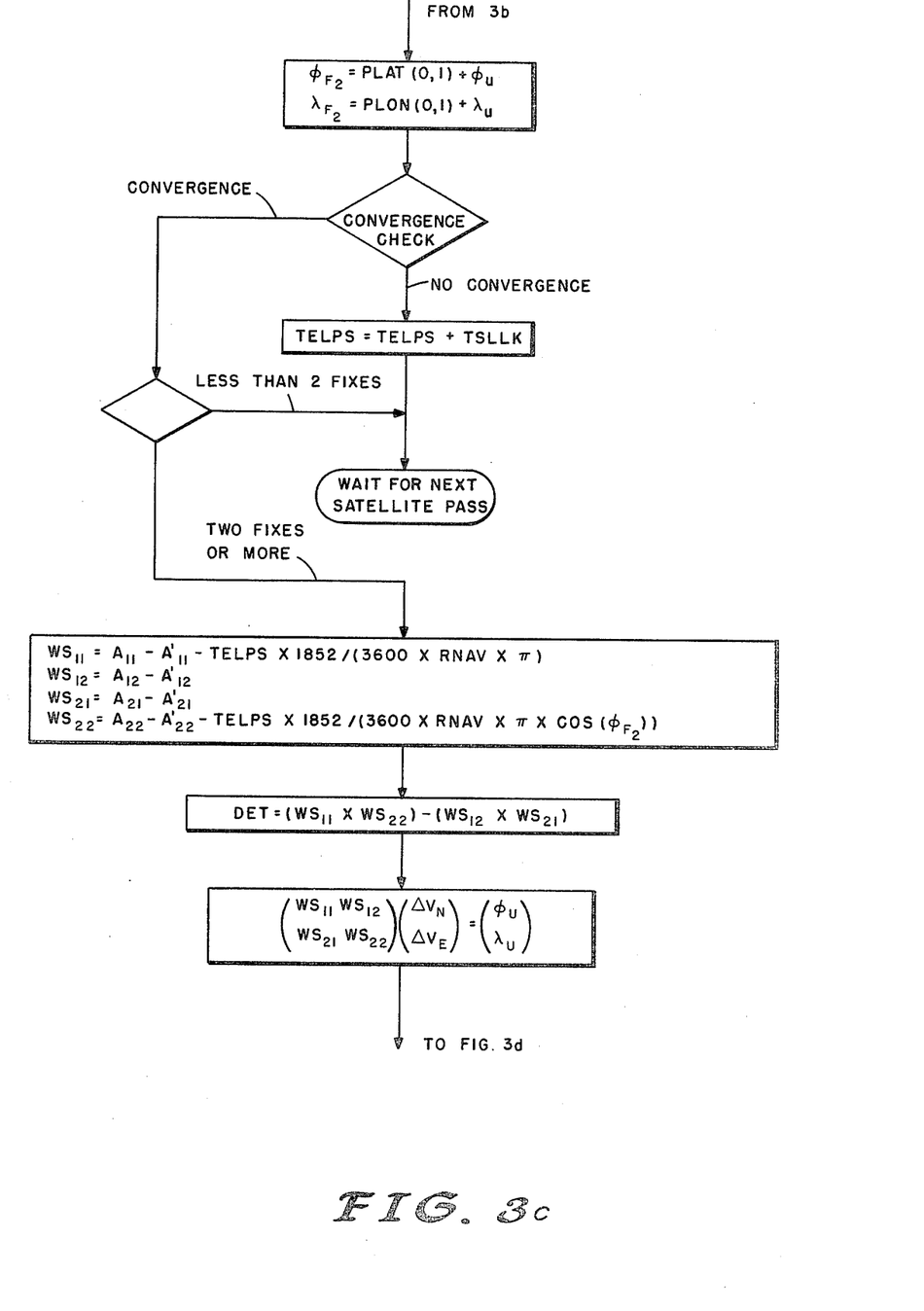
Figure 3D:
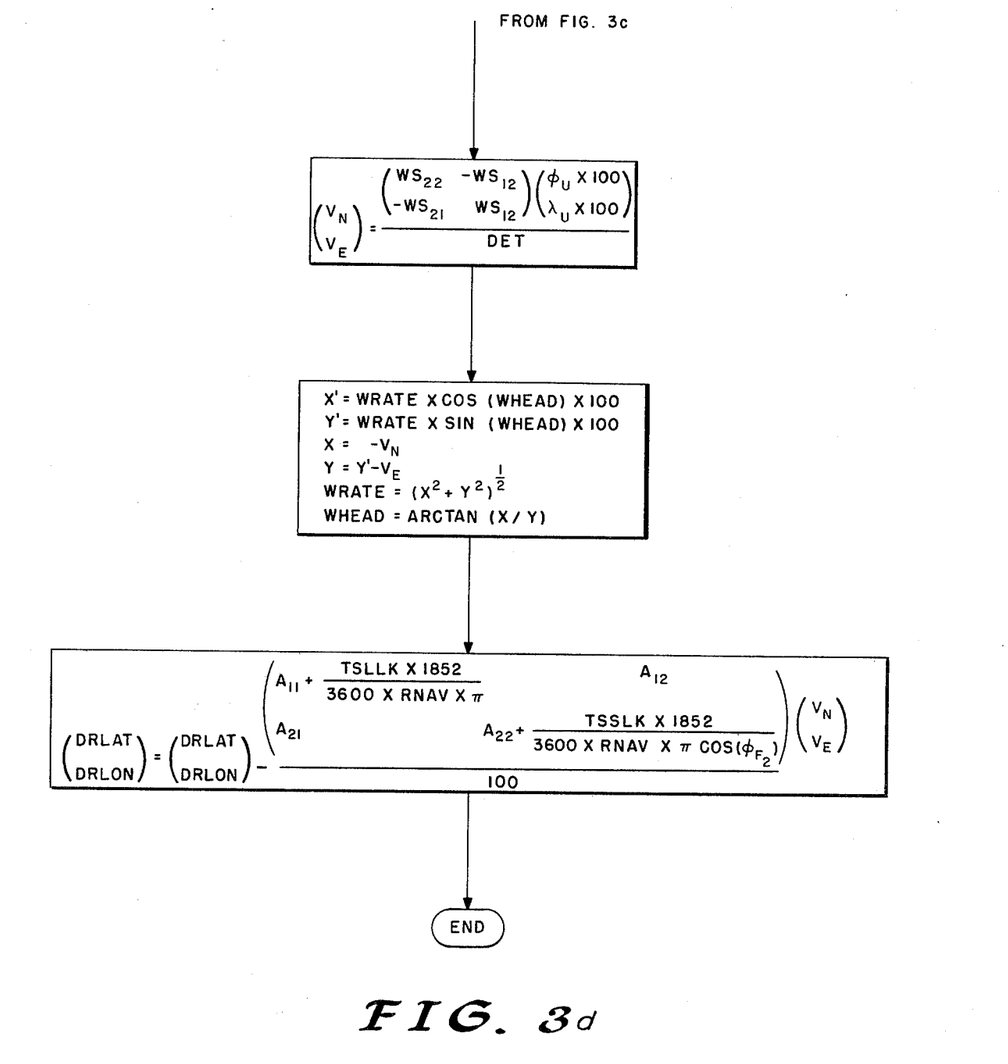

In similar fashion, a velocity east error of one knot is artificially introduced to determine the latitude and longitude sensitivity to this type of error. In FIG. 3 this is shown by first resetting the PLAT table to its original values (before the one knot velocity north error $v_N$ was introduced). By adding $\Delta\lambda$ (which is equal to $\Delta\phi/\cos\phi_F$) in a PLON table loop, the effect of a velocity east error $v_E$ can be determined in a SOLVE routine. The latitude and longitude changes or sensitivity in $\phi_u$ and $\lambda_u$ due to the one-knot velocity east error $v_E$ are then used to obtain adjusted $A_{12}$ and $A_{22}$ values. The PLON table values and the $\phi_u$ and $\lambda_u$ values are then restored to their original values. Original fixes $\phi_{F2}$ and $\lambda_{F2}$ (previously described in FIG. 2) are restored by combining PLAT (0,1) which corresponds to $\phi_{DR}$ (FIG. 2) with $\phi_u$ which corresponds to $(\phi_{DR} - \phi_{F2})$ and by likewise combining PLON (0,1) which corresponds to $\lambda_{DR}$ with $8\lambda_u$.

A measure of latitude and longitude sensitivity relative to orthogonal velocity errors which cause the difference between true position and satellite fix position results. The latter steps in the flowchart significantly enhance the position correction by accounting for errors and contingencies previously ignored by prior systems.

Figure 5:
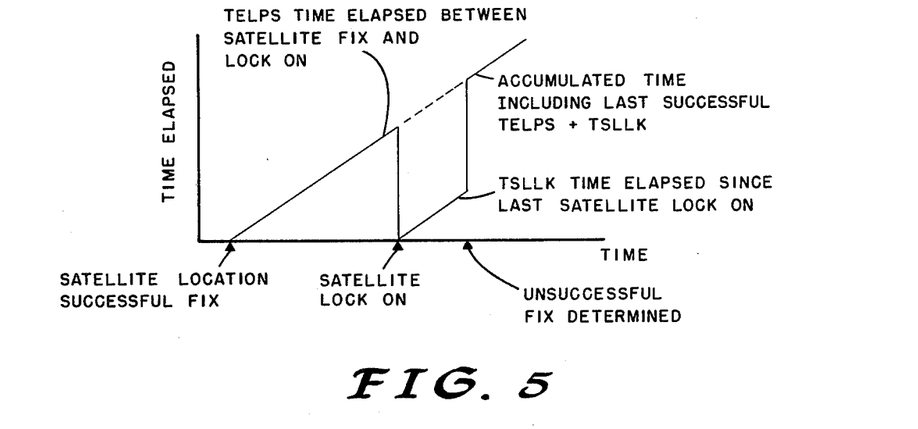
FIG. 5 is a graphical illustration showing how the present invention keeps track of elapsed times between satellite fixes.

To account for the elapsed time between a good fix and an unsuccessful fix attempt, time factors TSLLK and TELPS are included. TSLLK represents the time from the most recent attempt and is added to the time TELPS which represents the time between the last successful fix and the most recent fix attempt (see FIG. 5). The $A_{ij}$ values for the converging position determination replace the currently computed $A_{ij}$ values for any non-converging position and the water current solution is then determined when the next successful fix is obtained.

When convergence occurs, the $A_{ij}$ sensitivity matrix used in equation (6) is called forth. A new matrix in terms of $WS_{ij}$ is generated and a determinant DET is defined.

Specifically, the $WS_{ij}$ (i=1,2; j=1,2) terms comprise a sensitivity matrix and are defined as follows:

$WS_{11} = A_{11} - A'_{11} = TELPS \times 1852/(3600 \times RNAV \times \pi)$ $WS_{12} = A_{12} - A'_{12}$ $WS_{21} = A_{21} - A'_{21}$ $WS_{22} = A_{22} - A'_{22} - TELPS \times 1852/(3600 \times RNAV \times \pi \times \cos(\phi_{F2}))$.

Figure 6:
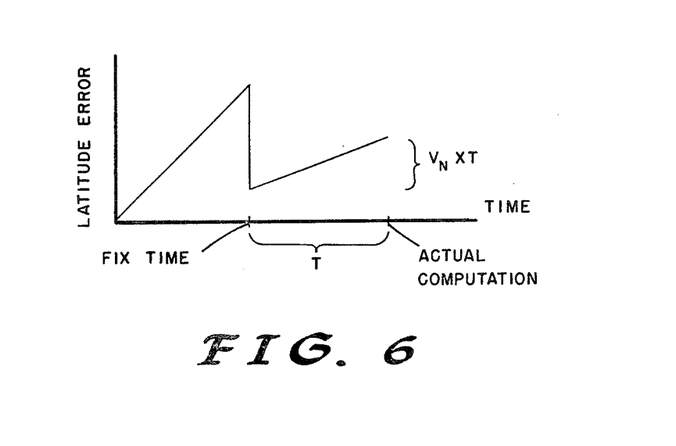
FIG. 6 is a graphical illustration showing how the present invention accounts for delay in position calculation relative to time of fix.

Corrections reflected in the $\phi_u$ and $\lambda_u$ matrix equations can be computed based on the $WS_{ij}$ matrix and velocity north ($v_N$) and velocity east ($v_E$) errors. Referring to FIG. 6, it can be noted that the dead-reckoning error related to the "fix time" is not computed until a time T after the fix time. During the time T the dead-reckoning system accumulates an additional error in position because it is still using an old erroneous water velocity. The present invention accounts for the time T (which is on the order of 15 minutes), during which time the additional latitude (and longitude) error is approximately $v_N \times T$ (or $v_E \times T$) (see FIG. 6). These additional error terms are compensated for.

Previous water velocities, X' and Y', determined before the new error was calculated, are updated as velocities X and Y which substract the error velocity $v_N$ or $v_E$ from the X' and Y' velocities, respectively. The updated water velocity is then defined by a rate and heading (WRATE and WHEAD) by simple geometry. The water velocity may also be represented by $v_W$ shown in FIG. 1.

The final corrected position, which provides for the elapsed time (TELPS) between converging calculated positions, and new water velocities X and Y, that account for ship motion between time of fix and time of position calculation, is shown in he final step of the flowchart of FIG. 3. The $$\begin{pmatrix} DRLAT \\ DRLON \end{pmatrix}$$

matrix on the right of the equality relates to position based on the previous velocity north and velocity east errors. The right-hand term of the final corrected position equality includes the $A_{ij}$ terms which define the sensitivity of fix positions to velocity error and TSLLK terms which recognize the error introduced due to the time interim between actual position computation and fix time, i.e., position error due to ship motion during computation.

The final values of DRLAT and DRLON include the total calculated latitude and longitude errors which correct the dead-reckoned position as close as possible to the actual current latitude and longitude.

It should of course be understood that within the scope of the appended claims the invention may be practiced other than as specifically described.

What is claimed is:

1. In a system having a satellite fix position determining means and a dead-reckoning means for continuously estimating position between satellite fixes, a method for correcting ocean vessel navigation errors due to essentially constant water currents, comprising the steps of:

periodically locking on to a satellite and determining present vessel position in latitude ($\phi_{F2}$) and longitude ($\lambda_{F2}$) using satellite fixes at lock-on, comparing satellite fix latitude ($\phi_{F2}$) and longitude ($\lambda_{F2}$) with dead-reckoned latitude ($\phi_{DR}$) and longitude ($\lambda_{DR}$), respectively, at the time of fix to yield update corrections in latitude ($\phi_u$) and in longitude ($\lambda_u$), defining differential functions ($A_{ij}$) which relate respective changes in current satellite fix position in latitude ($\phi_{F2}$) and longitude ($\lambda_{F2}$) to respective changes in velocity in the north ($v_N$) and east ($v_E$) directions, partially predicting satellite fix errors in latitude ($\phi_E$) and longitude ($\lambda_E$) at current and previous satellite updates as a function of the velocity changes ($v_N$ and $v_E$) and the differential functions ($A_{ij}$), determining the values for the differential functions $A_{ij}$, comprising the steps of introducing known velocity errors in the north and east directions and measuring variations in satellite fix latitude ($\phi_{F2}$) and longitude ($\lambda_{F2}$) positions resulting from the introduced known velocity errors, measuring the time (T) between satellite updates, and determining the velocity north and velocity east errors ($v_N$ and $v_E$) as a function of: time between satellite updates, update corrections ($\phi_u$ and $\lambda_u$), and differential functions ($A_{ij}$).

2. A method as in claim 1 wherein the determining of the velocity north error ($v_N$) and the velocity east error ($v_E$) comprises the step of:

approximating $v_N$ to a value of $\phi_u$ divided by the time $\tau$ between satellite fixes and approximating $v_E$ to a value of $\lambda_u$ divided by the time $\tau$ between satellite fixes.

3. A method as in claim 1 wherein the function determining the velocity north error ($v_N$) and velocity east error ($v_E$) is:

$$\begin{pmatrix} v_N \\ v_E \end{pmatrix} = \frac{\begin{pmatrix} A_{22} - A'_{22} - \tau & A'_{12} - A_{12} \\ A'_{21} - A_{21} & A_{11} - A'_{11} - \tau \end{pmatrix} \begin{pmatrix} \phi_u \\ \lambda_u \end{pmatrix}}{\Delta}$$

and where $\tau$ is the time between successive satellite fixes and where $A_{ij}'$ corresponds to $A_{ij}$ at the previous satellite fix.

4. A method as in claim 2 or 3 comprising the further step of:

removing a position error buildup due to the velocity errors $v_N$ and $v_E$ comprising the step of:

altering the dead-reckoned latitude and longitude positions $\phi_{DR}$ and $\lambda_{DR}$, with $\phi_{DR}$ and $\lambda_{DR}$ defined as:

$$\begin{pmatrix} \phi_{DR} \\ \lambda_{DR} \end{pmatrix} = \begin{pmatrix} \phi'_{DR} \\ \lambda'_{DR} \end{pmatrix} -$$

-continued $$\frac{\begin{pmatrix} A_{11} + \frac{TSSLLK \times 1852}{3600 \times RNAV \times \pi} & A_{12} \\ A_{21} & A_{22} + \frac{TSLLK \times 1852}{3600 \times RNAV \times \pi \cos(\phi_{F2})} \end{pmatrix} \begin{pmatrix} v_N \\ v_E \end{pmatrix}}{100}$$

where $\phi_{DR}'$ and $\lambda_{DR}'$ are the previous dead-reckoned latitude positions;

$A_{11} = \partial \phi_{F2}/\partial v_N$ $A_{12} = \partial \phi_{F2}/\partial v_E$ $A_{21} = \partial \lambda_{F2}/\partial v_N$ $A_{22} = \partial \lambda_{F2}/\partial v_E$ comprise the $A_{ij}$ functions;

RNAV is the distance to the center of the earth; and

TSLLK represents the time between the satellite lock-on and the time when the position error buildup is removed.

5. A method as in claim 4 comprising the further steps of:

storing previous water velocities X' and Y' in the north and east directions, respectively, subtracting the velocity north error ($v_N$) from the previous north water velocity (X') and subtracting the velocity east error ($v_E$) from the previous east water velocity (Y'), and vectorially combining the two difference values to provide a present water velocity output $v_w$.

* * * * *